(12) United States Patent
Ross et al.

(10) Patent No.: US 7,173,248 B2
(45) Date of Patent: Feb. 6, 2007

(54) METHODS AND SYSTEMS FOR POSITRON EMISSION TOMOGRAPHY DATA CORRECTION

(75) Inventors: Steven Gerard Ross, Waukesha, WI (US); Charles William Stearns, New Berlin, WI (US); Ravindra Mohan Manjeshwar, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 10/969,716

(22) Filed: Oct. 20, 2004

(65) Prior Publication Data
US 2006/0081784 A1 Apr. 20, 2006

(51) Int. Cl.
*G01T 1/164* (2006.01)
(52) U.S. Cl. .......................... 250/363.03; 250/370.09; 382/131
(58) Field of Classification Search ........... 250/363.03, 250/370.09; 375/4; 382/131
See application file for complete search history.

(56) References Cited

U.S. PATENT DOCUMENTS

| 6,804,325 | B1* | 10/2004 | Smith ........................... 378/37 |
| 2003/0161521 | A1 | 8/2003 | Newport |
| 2003/0190065 | A1* | 10/2003 | Hamill et al. ................ 382/131 |
| 2004/0030246 | A1* | 2/2004 | Townsend et al. .......... 600/427 |
| 2005/0129295 | A1* | 6/2005 | Shanmugam et al. ....... 382/131 |
| 2005/0152590 | A1* | 7/2005 | Thieret et al. .............. 382/131 |

OTHER PUBLICATIONS

T. Herbert and R. Leahy, "Fast methods for including attenuation in the EM algorithm", IEEE Transactions on Nuclear Science, vol. 37, No. 2, pp. 754-758, Apr. 1990.

M. Dahlbom, J. Reed, and J. Young, Implementation of True Continuous 2D/3D Whole Body PET Scanning, IEEE 2000 Medical Imaging Conference Record, NS 48(4):: 1465-1469, 2001.

M. Dahlbom, DC Yu, S. Cherry, A. Chatziionnou, and E. Hoffman, Methods for Improving Image Quality in Whole Body PET Scanning, IEEE Transactions on Nuclear Science, vol. 39, No. 4, pp. 1079-1083, 1992.

M. Defrise, P. Kinahan, D. Townsend, C. Michel, M. Sibomana, and D. Newport, "Exact and Approximate Rebinning Algorithms for 3D PET data", IEEE Transactions on Medical Imaging, pp. 145-158, 1997.

C. Stearns and S. Ross. , "Scaling of Counts for Overlapped Slices", PET Technical Report 99-02, Aug. 1999, GE Medical Systems, Waukesha, WI.

S. Schubert, S. Pajevic, R. Carson, "Whole Body PET Using Overlapped 3D Acquisition and Weighted Image Summation", IEEE Nuclear Science Symposium Conference Record, pp. 1285-1289, Nov. 1996.

* cited by examiner

*Primary Examiner*—Renee Luebke
*Assistant Examiner*—Mary Zettl
(74) *Attorney, Agent, or Firm*—The Small Patent Law Group LLP; Dean D. Small (57) ABSTRACT

Methods and systems for image overlap correction are provided. The method includes acquiring the emission projection data from a plurality of scan frames that extend across at least a portion of a length of an object being imaged wherein elements of the object lie between a region of overlap between two successive frames. The method further includes iteratively reconstructing a 3D image volume from multi-frame emission projection data by updating an estimate of 3D image volume using emission projection data from the plurality of frames within an iterative reconstruction loop.

21 Claims, 10 Drawing Sheets

METHODS AND SYSTEMS FOR POSITRON EMISSION TOMOGRAPHY DATA CORRECTION

BACKGROUND OF THE INVENTION

The invention relates generally to Positron Emission Tomography (PET) systems, and more particularly, to methods and systems for performing overlap correction of 3D PET data reconstructed with fully iterative 3D algorithms.

In a PET system, an image of an object of interest is reconstructed from a plurality of partial emission projection data sets. This is achieved by acquiring projection data on a frame basis, with each acquired frame covering a specific axial field of view (FOV). Typically, each frame is acquired for a specific duration, for example three minutes, and the table is then moved to acquire the next frame. However, in this method the sensitivity of the end slices of a frame may be less than the sensitivity of the center slices. As a result, the end slices of each frame have poorer image quality than the center slices. To overcome this limitation, the acquired frames are typically overlapped from one table position to the next.

Different approaches may be followed for merging overlapped 2D and 3D PET data. When PET data is acquired in 2D acquisition mode, a collimator is used to restrict data that is not perpendicular in the axial direction of the patient. Thus, in 2D acquisition mode, each measured data point represents a single axial slice of the patient and is referred to as a sinogram rather than a projection plane. When data is acquired in this mode, a single projection slice of one frame corresponds to the identical location of projection measurement of an adjacent overlapped frame. Because the data from both frames represents the same physical location, data can be combined in projection space to improve the statistics of the measurement. The PET data in the overlapped region is then combined to generate a consolidated image. A common method used for image consolidation is taking a weighted average of the corresponding sinogram data from the two frames.

An alternate approach that is followed is to combine the images after the projection data has been reconstructed. Image reconstruction may be defined as a method to generate an image from the emission projection data. The emission data represents the integral of radioactive tracer values across a straight line through the body of the patient. This emission data is transformed to an image plane during reconstruction. An image plane is a matrix representation of tracer activity within an x-y plane of the body. Further, an image volume represents several image planes along the z-axis of the body.

PET data is also acquired in fully 3D acquisition mode. In this mode, a collimator is not used to isolate events from a single perpendicular axial slice. Instead, data from all available axial angles is acquired into a 3D projection plane. Each 3D projection plane consists of a set of 2D sinograms acquired at multiple axial angles and displacements. In 2D acquisition, sinogram lines of response through the overlapped regions do not pass through non-overlapped regions. The separability between the overlapped regions and non-overlapped regions permit the addition of the sinograms for the overlapped regions from the two frames. In a 3D acquisition, certain lines of response pass through both the overlapped region and non-overlapped regions. This makes the addition of projection data from multiple frames more complex.

A common method of reconstructing 3D PET projection plane data is to use Fourier Rebinning to convert the data to a stack of 2D sinograms. Once the data has been converted to 2D sinograms, the sinograms may be combined prior to reconstruction as in a 2D acquisition. When Fourier Rebinning is not used, 3D projection data is difficult to combine prior to reconstruction. In these instances, 3D data is typically combined after image reconstruction. However, combining data after image reconstruction reduces the available statistics for the image estimation portion of the process and may result in suboptimal image quality.

BRIEF DESCRIPTION OF THE INVENTION

In an exemplary embodiment, a method for image overlap correction for a positron emission tomography system is provided. The method includes acquiring the emission projection data from a plurality of scan frames that extend across at least a portion of a length of an object being imaged wherein elements of the object lie between a region of overlap between two successive frames. The method further includes iteratively reconstructing a 3D image volume from multi-frame emission projection data by updating an estimate of 3D image volume using emission projection data from the plurality of frames within an iterative reconstruction loop.

In another exemplary embodiment, a positron emission tomography (PET) system is provided. The PET system including a positron emission tomography scanner, and a controller for controlling the operation of the positron emission tomography scanner to combine overlapping portions of a plurality of frames of data, said controller comprising a memory, said controller configured to iteratively, for a plurality of 3D image planes, forward project an estimate of a current image volume, combine the forward projected estimate with a ratio of measured emission data and measured correction data to generate a ratio projection plane, backproject the ratio projection plane to form a ratio image volume, backproject the measured correction data to form a correction image volume, combine the ratio image and correction image from each frame to generate correction and ratio image volumes, and combine the ratio image volume with the correction image volume for the plurality of image frames to generate a subsequent estimate of the image volume.

DETAILED DESCRIPTION OF THE INVENTION

Various embodiments of the invention relate to overlap correction in 3D iterative reconstruction of 3D Positron Emission Tomography (PET) data. In a PET system, the 3D emission data is acquired on a frame-by-frame basis, with each frame having a defined axial Field of View (FOV), also referred to as an axially spaced portion of the object of interest. The FOV of a frame typically overlaps with the FOV of an axially adjacent frame. A projection plane may be defined as, but is not limited to a measured set of projection values that are present along a straight-line trajectory representing an integral of activity within the body of the patient being scanned.

In order to generate a consolidated 3D image in the image plane, the overlapping data from adjacent frames is merged within the iteration loop of a fully 3D iterative reconstruction algorithm. An image plane is a matrix representation of tracer activity within the x-y plane of the body. An image volume represents several image planes along the z-axis of the body. In addition, backprojection may be defined as, but is not limited to a method of converting data from a measured projection plane to an image plane. In the backprojection process, the value of each image element along a line of response, between two detector elements, is computed. Alternatively, reprojection (or forward projection) may be defined as, but is not limited to a method of converting data from image space to projection space via integration along a path in image space. The 3D iterative image reconstruction techniques described here include backprojection and reprojection. Examples of image reconstruction techniques include filtered backprojection reconstruction, and iterative reconstruction.

In general, various embodiments of the present invention facilitate overlap correction of 3D PET data within a fully 3D iterative image reconstruction method. Iterative reconstruction of PET data may include, but is not limited to, establishing an initial estimate of the image and iteratively revising the estimate to generate the final image. The estimate is revised based on a comparison of the measured projection data with the projection data. This is done by forward projecting the intermediate image estimates to the projection plane.

Figure 1:
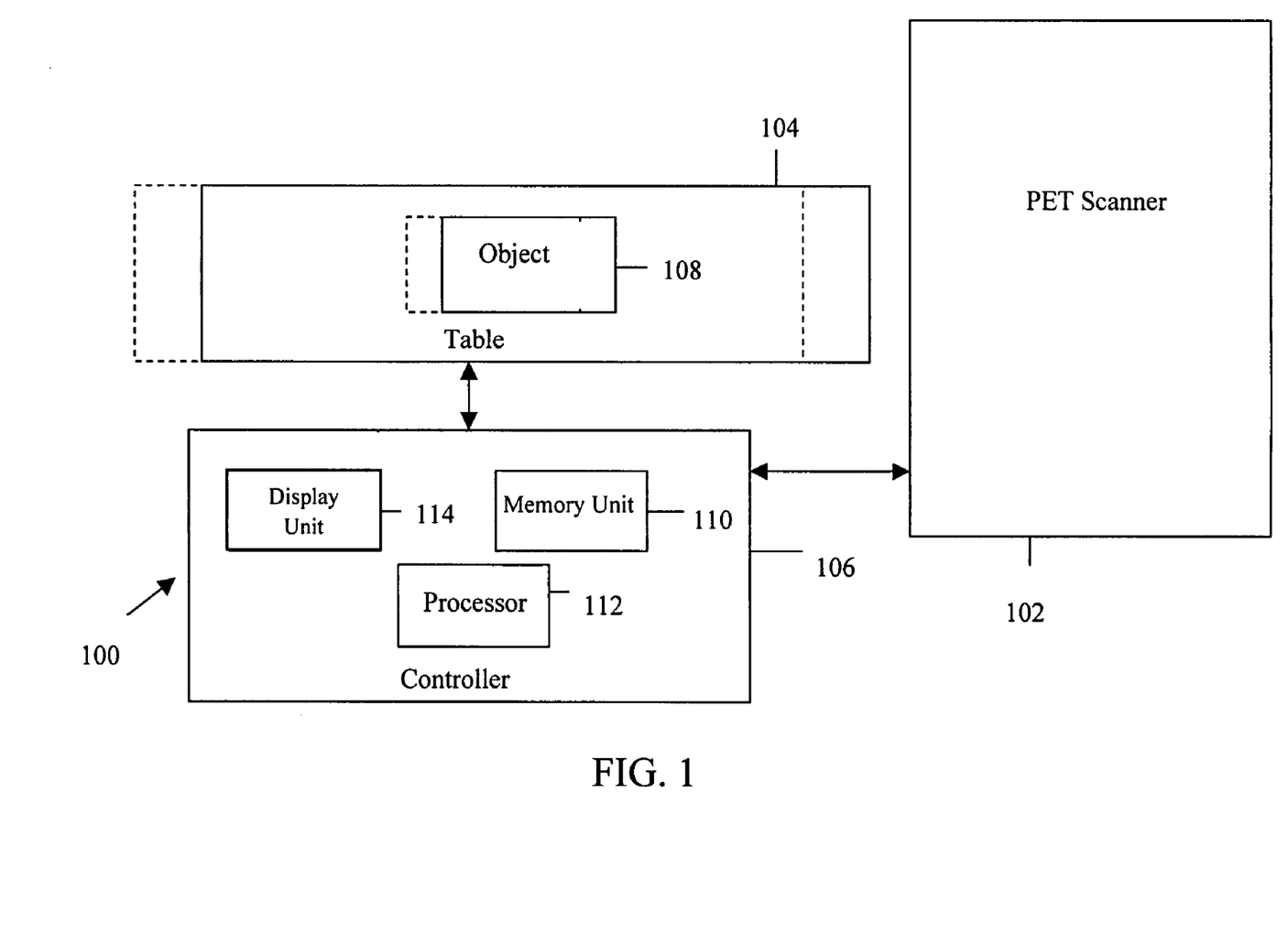
FIG. 1 is a block diagram of a Positron Emission Tomography (PET) scanner that performs overlap correction of 3D PET data during iterative image reconstruction.

FIG. 1 is a block diagram of an exemplary PET system 100 that performs overlap correction of 3D PET data during iterative image reconstruction. PET system 100 includes a PET scanner 102 that includes a bore therethrough that defines an imaging area, a table 104 accessible to the bore, a controller 106 communicatively coupled to PET scanner 102, and an object 108 to be scanned, generally supported by table 104. In the exemplary embodiment, table 104 is communicatively coupled to controller 106 to facilitate automatic scanning of object 108. Controller 106 includes a memory unit 110, a processor 112, and a display unit 114. PET scanner 102 may include one or more coaxial rings, or partial rings, of detectors to detect a pair of photons emitted from an annihilation event. In addition, Controller 106 controls the data acquisition, data correction, and image reconstruction process. In PET system 100, object 108 is placed over table 104. Object 108 generates positrons that, after loosing most of their energy, interact with electrons present in object 108. The interactions between positrons and electrons (termed as annihilation) generate photons that are finally captured by PET scanner 102. PET scanner 102 converts these photons to electrical signals, which are later used by controller 106 to generate a projection image. In addition, PET system 100 acquires projection data of area of interest of object 108 using a plurality of partial projection frames. PET system 100 splits the area of interest axially into different frames that are captured by at discrete acquisition table 104 locations. The motion of table 104 is regulated by controller 106. The emission projection frames may be stored in memory unit 110. In various embodiments of the invention, memory unit 110 may include, but not limited to, Random Access Memory (RAM) and Read Only Memory (ROM), a hard disk or a floppy disk. These emission projection frames are later utilized by processor 112 for image reconstruction. Post reconstruction, the image volume generated may be displayed using display unit 114. In various embodiments of the invention, display unit 114 may include a cathode ray display, a LCD display, and a plasma display.

Figure 2:
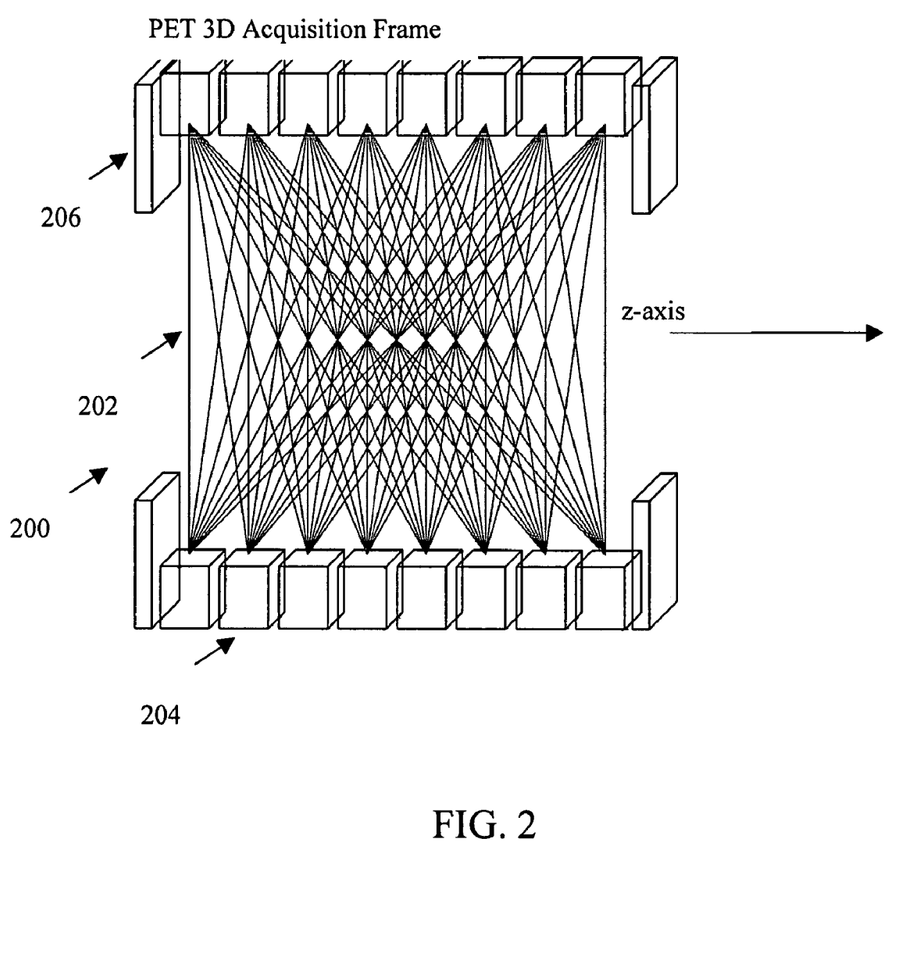
FIG. 2 is a block diagram of a 3D PET acquisition frame captured by PET scanner in accordance with FIG. 1.

FIG. 2 is a diagram of a 3D PET acquisition frame 200 at a single table location. A projection data 202 is emitted by an object being scanned by PET system 100. Projection data 202 is captured by a plurality of detector elements 204. The frame includes a shielding 206 at the end of the frame's axial field of view. There is no collimation (as exists 2D acquisition mode) to isolate detector elements in the axial direction, allowing projection data 202 to be acquired from multiple axial angles.

Figure 3:
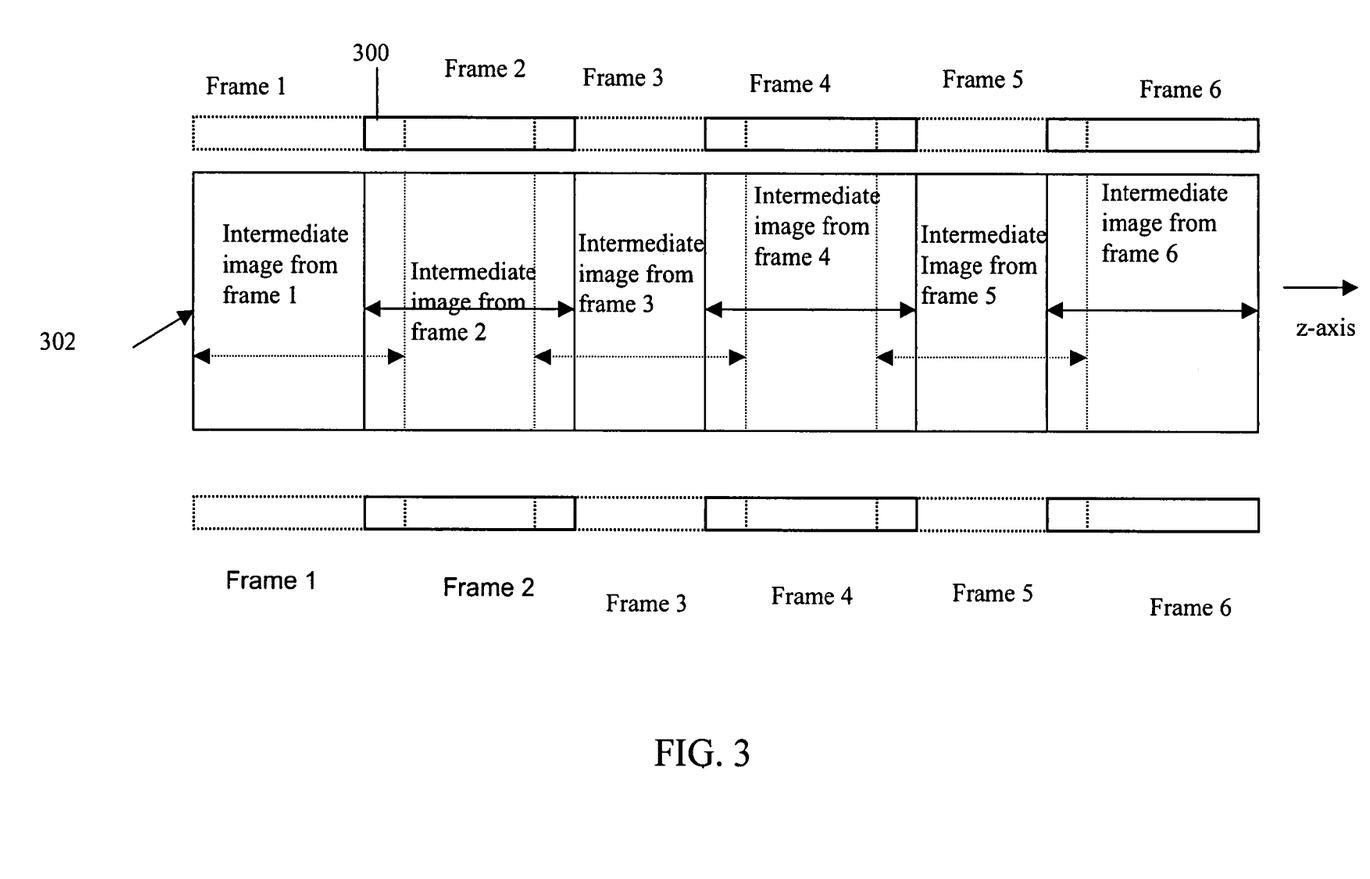
FIG. 3 is a block diagram of the frames captured by PET scanner in accordance with FIG. 1.

FIG. 3 is a block diagram of exemplary emission projection plane frames captured by PET system 100. Each frame in FIG. 3 represents a single frame 200 (as described in FIG. 2). The frames (frame 1, frame 2, and henceforth) may be defined as, but are not limited to measured emission data of an integral of activity along a straight-line trajectory through the Field of View (FOV) of the area of interest of object 108. The frames captured by PET system 100 include overlapping regions. For example, Frame 1 and Frame 2 have overlapping region 300. Data from each frame is backprojected to create an intermediate ratio image 302. Just like intermediate ratio images 302, an intermediate ratio image is obtained for each frame. The data in the overlapped region of intermediate ratio images is combined into a volume ratio image. This data is used to generate a next level estimate for volume ratio image. A single intermediate ratio image is obtained for each update of an iteration or subset of an iteration.

Figure 4:
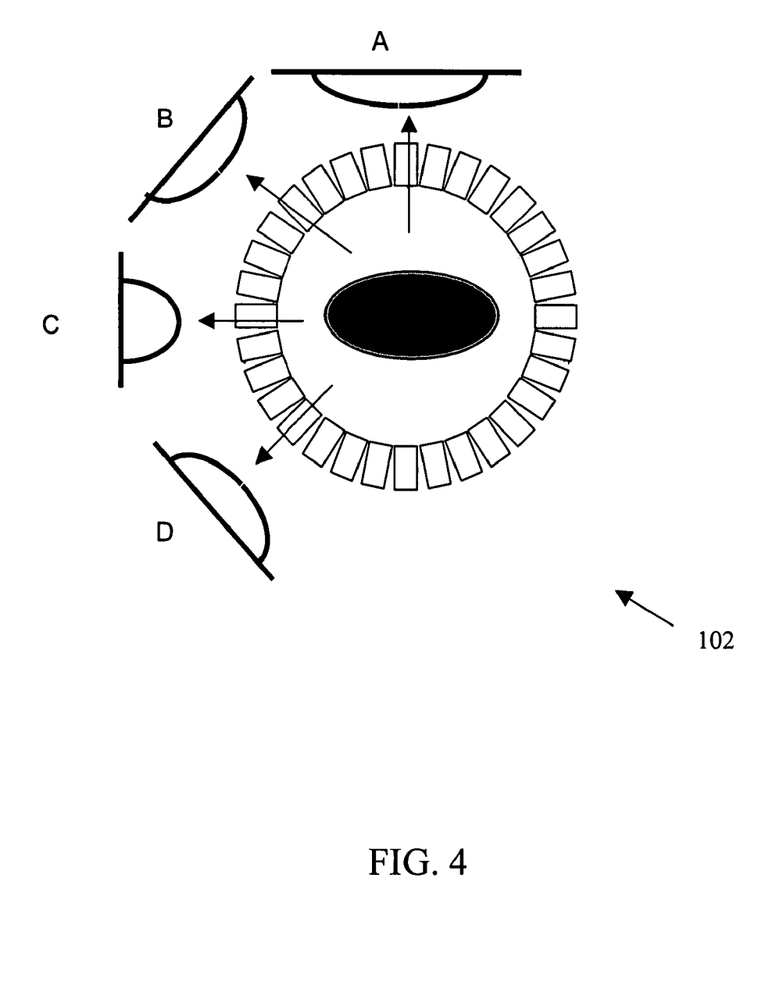
FIG. 4 is a block diagram of subsets of frames in accordance with FIG. 3.

FIG. 4 shows subsets of frames shown in FIG. 3. Subsets of frame 1, frame 2, and henceforth include, but are not limited to a set of projection views (A, B, C, and D) selected from a set of all the views captured while scanning object 108. For example, while scanning object 108, out of a set of 210 views captured by PET system 100 (over an angle of 180°), a subset may be formed with 10 views. These views may be referred to as the $i^{th}$ views of an $m^{th}$ subset. For example, the $i^{th}$ views of the $m^{th}$ subset may represent angles at every 18 degrees. Subsets m of frame 1, frame 2, and henceforth are used to form a new estimate of image of object 108. In various embodiments of the invention, these subsets may be used in image reconstruction by using Ordered Subset-Expectation Maximization (OSEM) algorithm. Further details regarding the application of this algorithm are described in accordance with FIGS. 6A, 6B, 6C, and 6D.

Figure 5A:
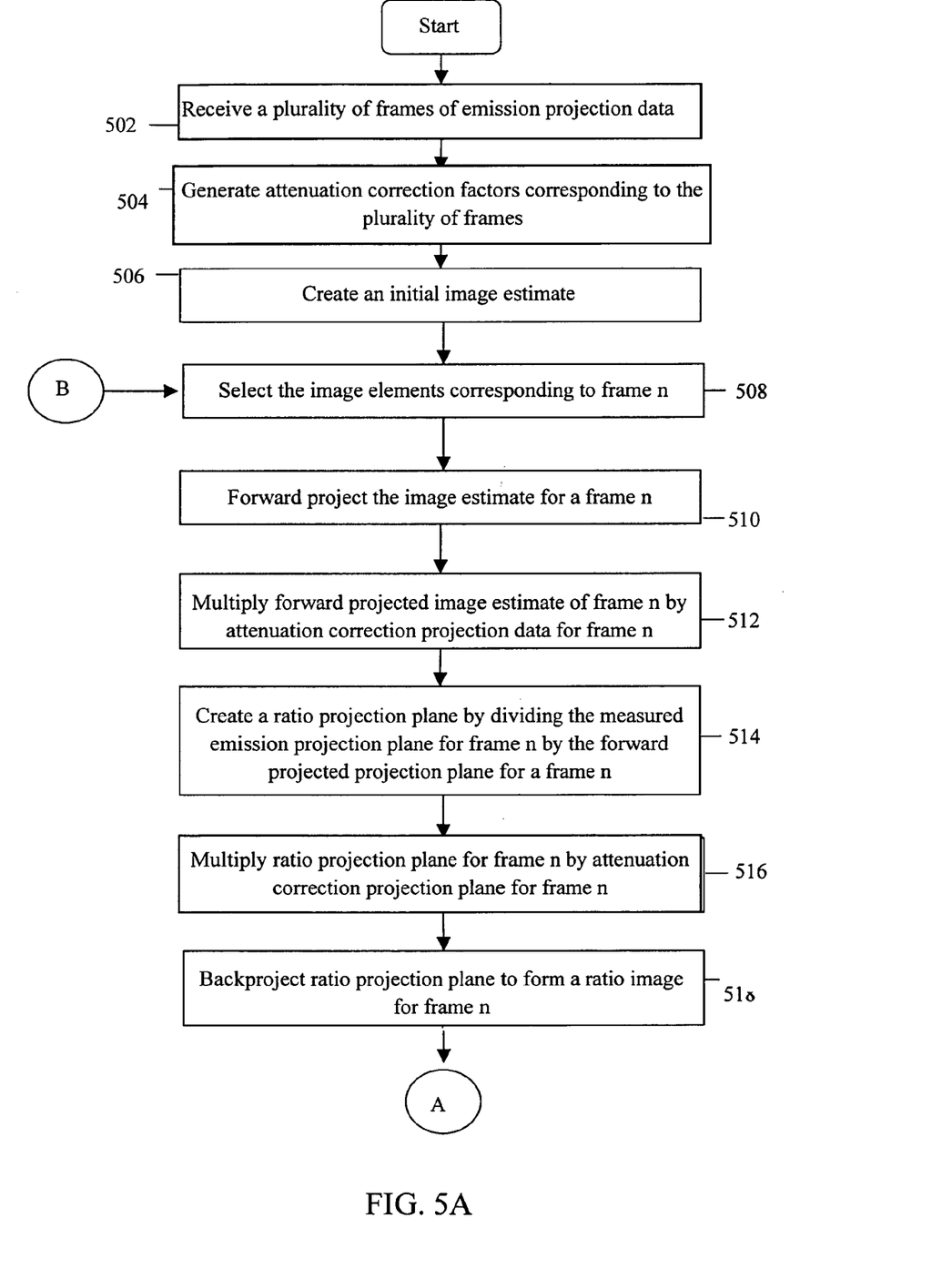
FIGS. 5A and 5B is a flowchart that describes the steps followed in overlap correction in iterative image reconstruction of 3D PET data, according to an exemplary embodiment of the invention.
Figure 5B:
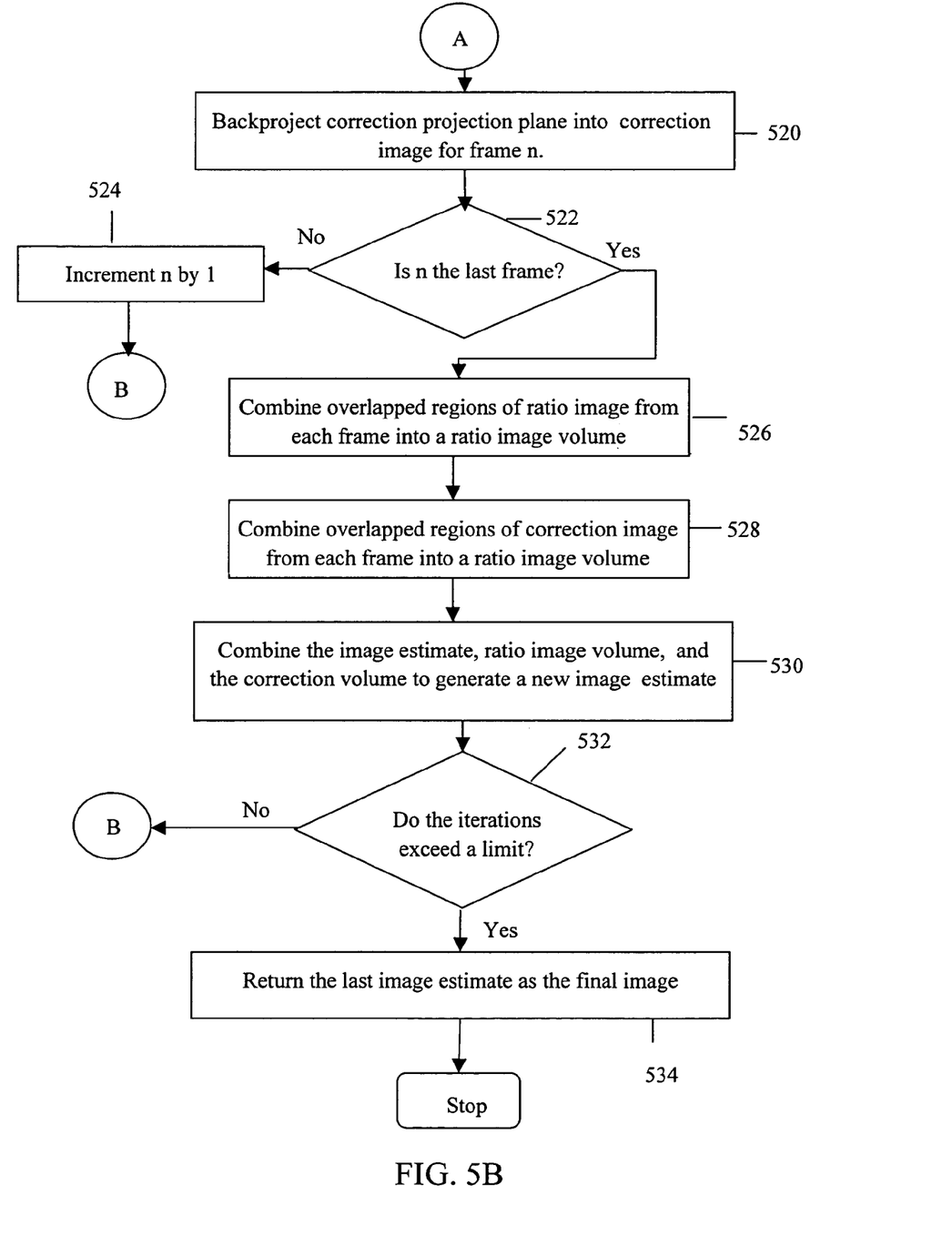

FIGS. 5A and 5B show a flowchart that describes the steps followed in overlap correction during iterative image reconstruction of 3D PET data, according to an exemplary embodiment of the invention. At 502, a plurality of frames of emission data is received. The emission data represents the projection values that are captured along a line through a patient. The projection values represent the integral of tracer activity along a line within the body being scanned. This emission projection data may be, but is not required to be, corrected for photon scatter, presence of random events, scanner deadtime, scanner detector efficiency, scanner geometric effects, and radiopharmaceutical decay. These projection frames are stored in memory unit 112 (as shown in FIG. 1). At 504, correction data corresponding to the emission data is determined. This correction data may consist of, but are not limited to, an estimate of the attenuation coefficients. At 506, an initial image volume estimate is generated. The initial image volume estimate can take alternative forms and may consist of a uniform image or of an estimate obtained from a reconstruction technique such as filtered backprojection.

At 508, the image volume estimate is forward projected to the projection plane. While forward projecting, the image volume estimate is multiplied to a projection matrix. A projection matrix may be defined as, but is not limited to a matrix that converts image data from image space to a projection plane. The matrix includes projection ratios that may define the geometry of PET scanner 102. The multiplication of the image estimate with this matrix results in a matrix in the projection plane, that contains the contribution of each value in the image plane with respect to each projection line in the projection plane. At 510, the forward projected image is multiplied by the attenuation correction factors 504. At 512, a ratio projection plane is generated from the forward projected image estimate, the measured emission projection data, and the attenuation correction projection data. The ratio projection plane may be defined as, but is not limited to a projection plane made by a ratio of two matrices, namely a first and a second matrix.

The first matrix consists of the measured emission data (received at 502). The second matrix consists of the forward projected image estimate (generated at 508) multiplied by attenuation correction. At 514, the ratio projection matrix is then multiplied by attenuation correction factors (of 504).

At 516, the ratio projection plane is backprojected to create a ratio image for the current frame. At 518, the correction projection plane is backprojected to create a correction image for the current frame. The backprojection operation may be represented as a multiplication of the projection data with a backprojection matrix representing the geometry of the measurement system and body being scanned. The backprojection operation adds the value of each projection data point in the image elements along the line being backprojected to the current image element value. At 520, ratio image and correction images from each frame are combined into a correction and ratio image volume. At this point, data in overlapped regions of the ratio image and correction image are combined to improve the accuracy of the ratio image and correction images estimates. In regions of no overlap, only ratio and correction images generated from the contributing frame are used. At 522, the previous image volume estimate, the ratio image volume for all frames and the correction image volume for all frames are combined. The ratio image volume matrix is divided by the correction image volume matrix, and then multiplied to the current image estimate to generate the new image volume estimate. The resultant gives the next image volume estimate. At 524, it is determined whether the number of iterations for generating the image volume exceed a threshold value. If the number of iterations exceed the threshold, the image volume estimate of the latest iteration is returned at 526, as the final image volume. Otherwise, 508 to 524 are performed iteratively, and the revised set of values for each frame is computed.

FIGS. 6A, 6B, 6C, and 6D show a flowchart that describes the steps followed in overlap correction in iterative image reconstruction of 3D PET data, according to another exemplary embodiment of the invention. The embodiment performs overlap correction of 3D PET data through Attenuation Weighted Ordered Subset-Expectation Maximization image reconstruction algorithm. This algorithm splits the data from frames into subsets (as described in FIG. 4), such that only those subsets that belong to the same group are analyzed at a time. These subsets are first combined and then reconstructed to iteratively generate the final image. Further details regarding this algorithm are described in a research paper by T. Herbert and R. Leahy, titled "Fast methods for including attenuation in the EM algorithm", in the IEEE Transactions on Nuclear Science, Vol 37, No. 2, pp. 754–758, in April, 1990. The research paper uses the Expectation-Maximization (EM) algorithm for generating an image estimate The steps followed in the embodiments are based on the following equation:

$$F_{j\ OSEM}^{(k,m+1)} = \frac{F_j^{(k,m)}}{\sum_{n=1}^{nFrames} \sum_{i \in S_m} A_{in} P_{ij}} \sum_{n=1}^{nFrames} \sum_{i \in S_m} \frac{A_{in} \lambda_{in} P_{ij}}{\sum_{j'} A_{in} P_{ij'} F_{j'}^{(k,m)}} \quad (1)$$

where $\lambda$ refers to the measured emission projection data from all the frames, and $\lambda_{in}$ refers to the $i^{th}$ view of the $m^{th}$ subset of data corresponding to the $n^{th}$ the frames in the emission image;

A refers to the correction data, and $A_{in}$ refers to the correction values corresponding to the $i^{th}$ view of the $m^{th}$ subset from the $n^{th}$ frame;

P refers to the projection matrix that can be defined as a matrix representing the geometry of PET scanner 102 (as described in FIG. 1). In addition, $P_j$ refers to the $i^{th}$ view of projection values corresponding to the $m^{th}$ subset. Summation of P over the first index represents backprojection from projection space to image space, summation of P over the second index represents forward projection from image space to projection space;

$F^{(k,m)}$ refers to the image estimate at the $m^{th}$ subset and $k^{th}$ iteration, and $F_j^{(k,m)}$ refers to the image estimate for pixel j of $m^{th}$ subset of iteration k.

Figure 6A:
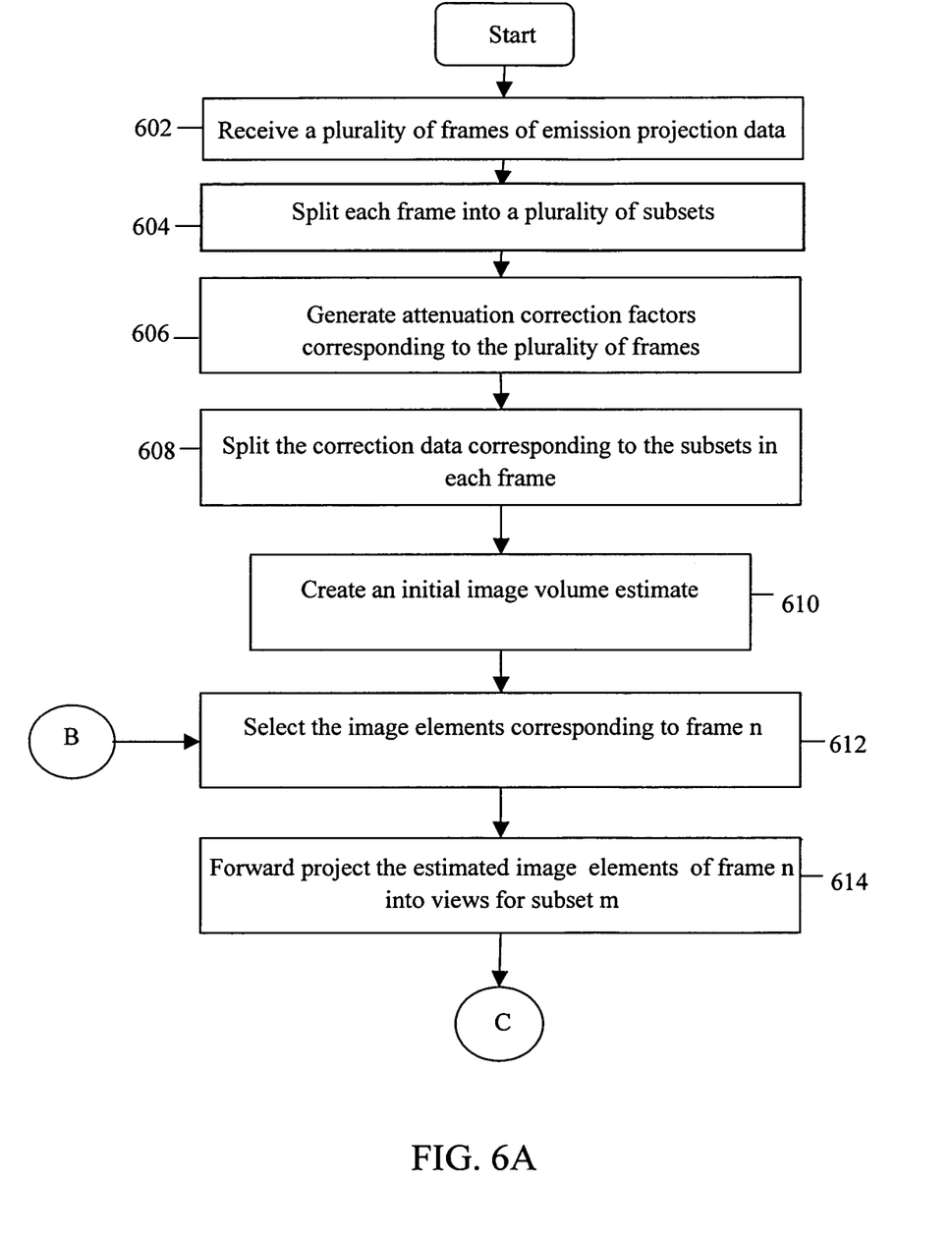
FIGS. 6A, 6B, 6C, and 6D is a flowchart that describes the steps followed in overlap correction in iterative image reconstruction of 3D PET data, according to another exemplary embodiment of the invention.

At 602, emission data ($\lambda$) is received for a plurality of frames. The emission data that is received from the frames includes projection values that are captured along a line through the body of a patient. This emission projection data may be, but is not required to be, corrected for photon scatter, presence of random events, scanner deadtime, scanner detector efficiency, scanner geometric effects, and radiopharmaceutical decay. At 604, emission data ($\lambda$) from each frame is split into a plurality of subsets, for example $\lambda_i$ representing angles i which form the $m^{th}$ subset (as shown in FIG. 4). At 606, attenuation correction data (A) corresponding to each frame is identified. In various embodiments of the invention, the correction data generated may include, but is not limited to, attenuation correction. At 608, the correction data is split into subsets ($A_i$) corresponding to i correction angles of the $m^{th}$ subset derived from the emission data (at 604). At 610, an initial image volume estimate ($F^{(k,m)}$) is made. This image estimate is made in the image plane.

Figure 6B:
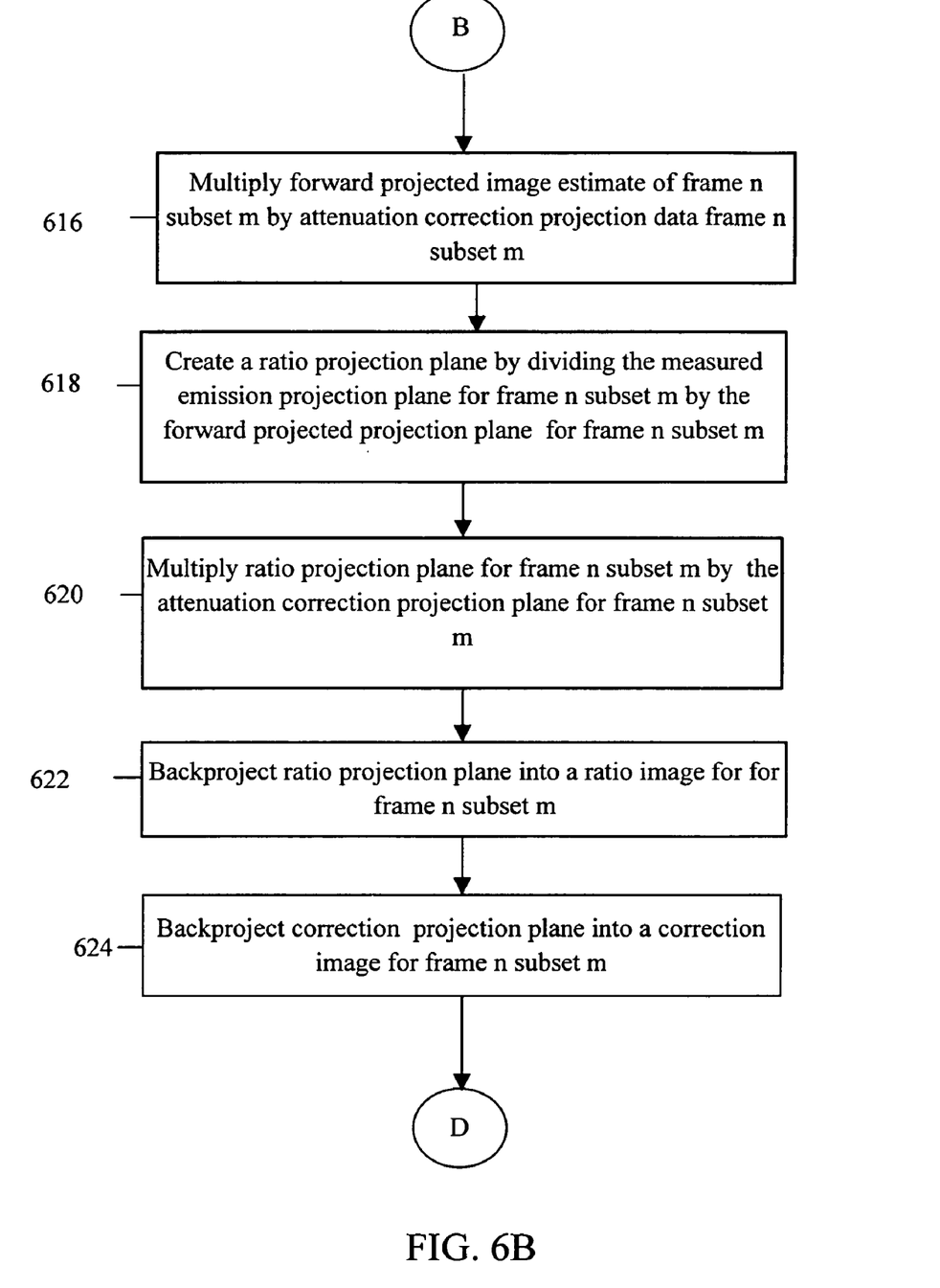

At 612, the image estimate corresponding to a subset m ($F_j^{(k,m)}$) of frame n in emission data is determined. At 614, the selected image estimate of subset m (at 612) is forward projected. At 616, the forward projected subset m is multiplied by attenuation correction factors (from 608). This forward projection and multiplication step is generated as follows:

$$\sum_{j'} A_{in} P_{ij'} F_{j'}^{(k,m))} \quad (2)$$

At 618, a ratio projection plane is obtained by dividing the emission projection plane data by the forward projected image estimate. At 620, the ratio projection plane is multiplied by the attenuation correction factors corresponding to subset m. In one embodiment, this is process can be described as follows:

$$\frac{A_{in} \lambda_{in}}{\sum_{j'} A_{in} P_{ij'} F_{j'}^{(k,m)}} \quad (3)$$

Figure 6C:
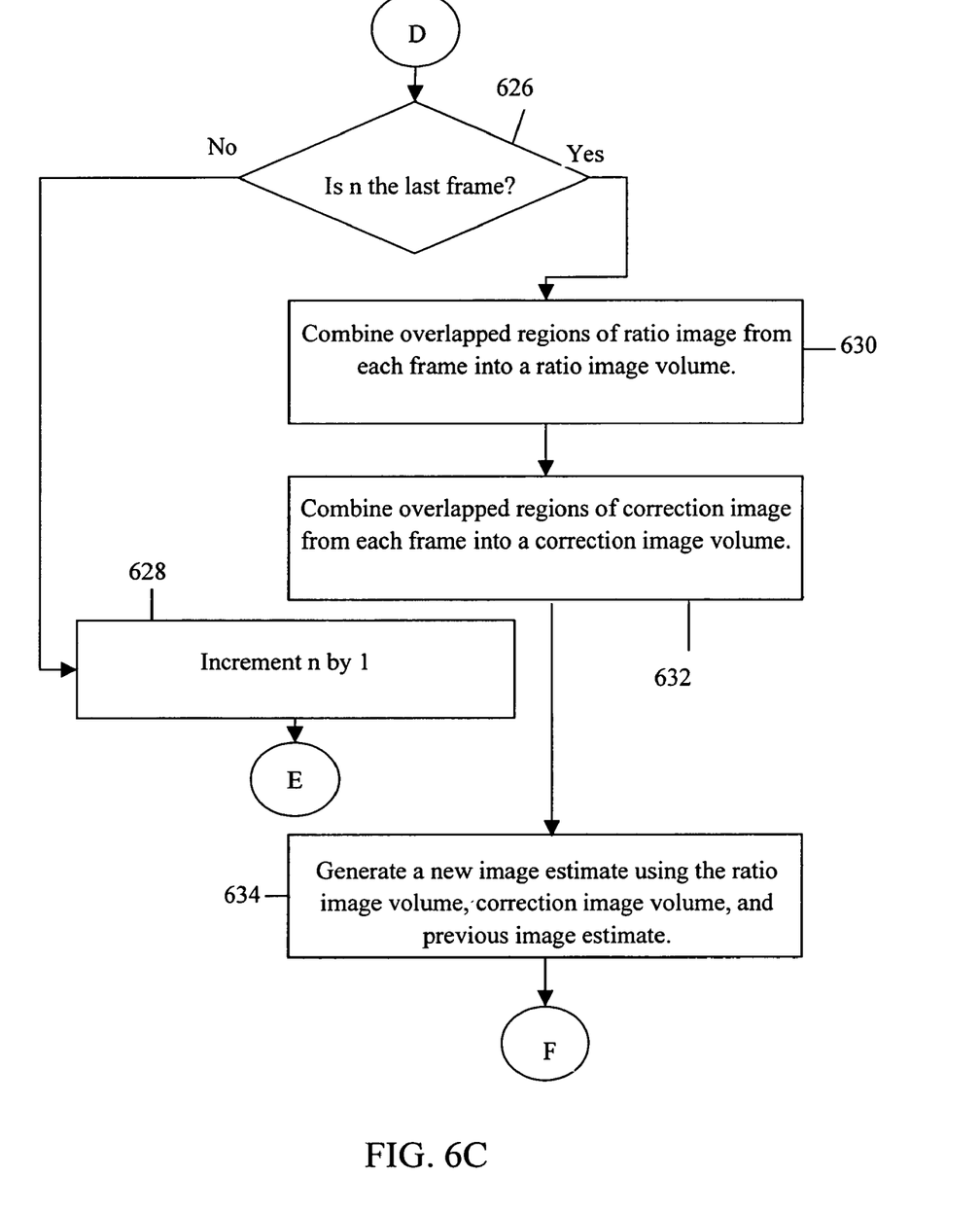

At 622, the ratio projection plane for subset m and frame n is backprojected. This is done by multiplying the ratio projection of equation (3) by projection matrix $P_{ij}$ and summing them over the first index of the projection matrix $P_{ij}$ (summation over first index represents backprojection) to create a ratio image for the current frame and subset. The generation of the ratio image is described by the following expression:

$$\sum_{i \in S_m} \frac{A_{in} \lambda_{in} P_{ij}}{\sum_{j'} A_{in} P_{ij'} F_{j'}^{(k,m)}} \quad (4)$$

At 624, the correction projection plane corresponding to frame n and subset m is backprojected to obtain a correction image for the frame n and subset m. The correction projection matrix can be defined as, but is not limited to a matrix that quantifies the contribution of correction values in the projection plane. The correction image volume can be described by the following expression:

$$\sum_{i \in S_m} A_{in} P_{ij} \quad (5)$$

In various embodiments of the invention, the ratio image volume, and the correction image volume may be generated simultaneously.

In various embodiments of the invention, the ratio image volume may be generated after the correction image volume.

At 626, a check is made to identify if there are any remaining frames to process for the current subset. If there are remaining frames, frame n is incremented (at 628) and steps 612–626 are repeated. If n is the final frame, at 630, the ratio image data from each frame is combined to form a ratio image volume. At this step, data in overlapped regions of the ratio image are combined to improve the accuracy of the ratio image estimate. This step is described by the following expression:

$$\sum_{n} \sum_{i \in S_m} \frac{A_{in} \lambda_{in} P_{ij}}{\sum_{j'} A_{in} P_{ij'} F_{j'}^{(k,m)}} \quad (6)$$

Figure 6D:
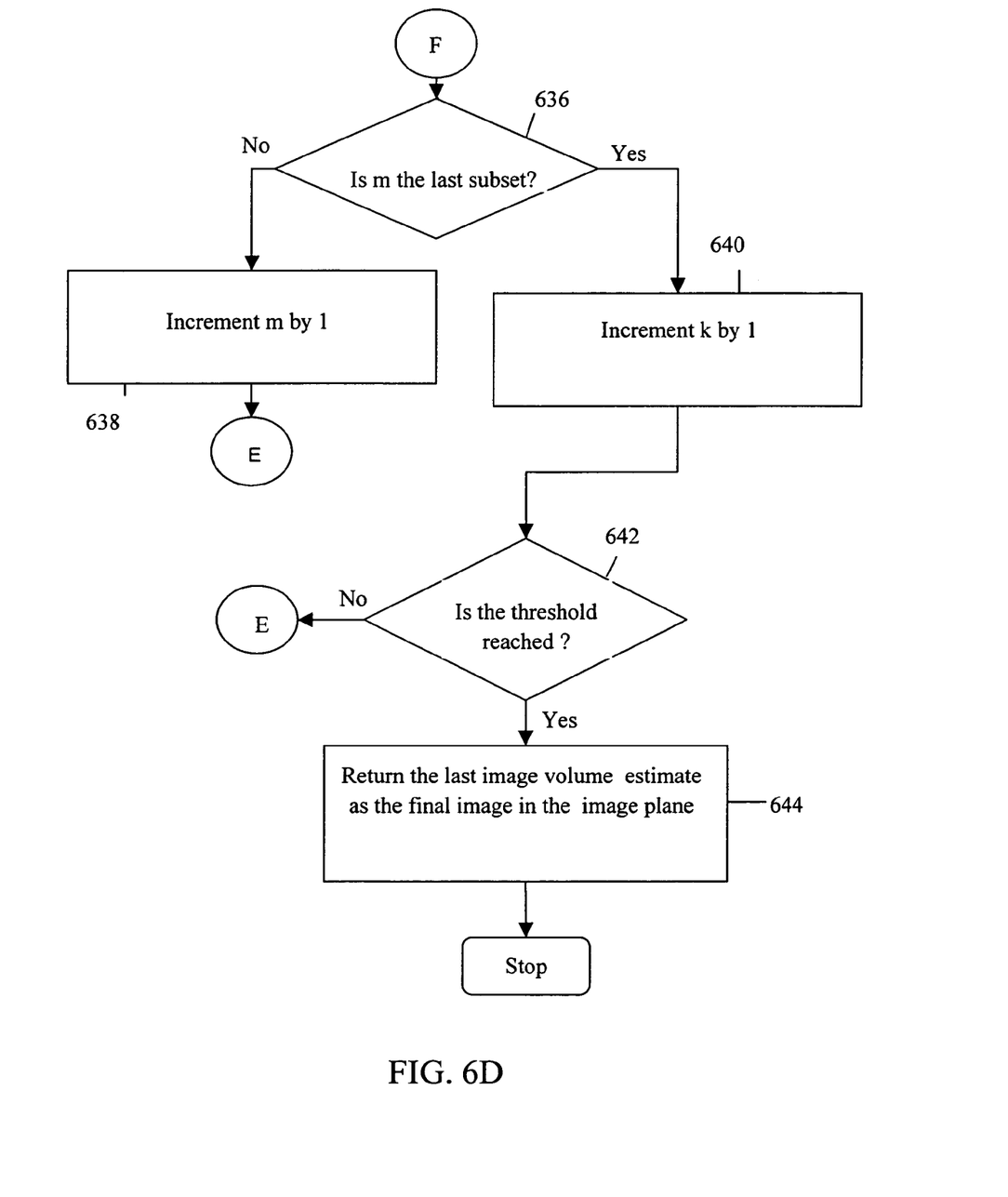

At 632, the correction image data from each frame is combined to form a correction image volume. At this step, data in overlapped regions of the correction image are combined. This step is described by the following expression $$\sum_{n} \sum_{i} A_{in} P_{ij} \quad (7)$$

At 634, a new image estimate (m+1$^{th}$) is generated by using the image estimate of the m$^{th}$ subset and k$^{th}$ iteration image estimate, the m$^{th}$ subset and k$^{th}$ iteration correction image volume, and the m$^{th}$ subset and k$^{th}$ iteration ratio image volume. The new image estimate is generated as described in equation (1). At 636, it is tested if m is the last subset. If it is not, m is increment and steps 612–636 are repeated for the next subset. If m is the last subset, the iteration k is incremented at 640. At 642, it is checked if this iteration exceeds the defined threshold. If it does not, the steps 612–642 are repeated for all subsets and frames. If 642 is the last iteration, the current image estimate is returned as the final image at 644.

A technical effect of the invention is that it improves the statistics of pixels in the region of overlapped frames. This is achieved by combining the 3D data within the 3D iterative reconstruction process, as opposed to reconstructing each frame independently and combining the data after reconstruction.

In various embodiments of the invention, the method of overlap correction can be implemented in software, hardware, or a combination thereof. The method provided by the present invention can be implemented in software by using standard programming languages such as C, C++ and Java.

In various embodiments of the invention, the method of overlap correction as described in the invention or any of its components may be embodied in the form of a processing machine. Typical examples of a processing machine include a general-purpose computer, a programmed microprocessor, a digital signal processor (DSP), a micro-controller, a peripheral integrated circuit element, and other devices or arrangements of devices, which are capable of implementing the steps that constitute the method of the disclosed invention.

The processing machine executes a set of instructions (corresponding to the method steps of the present invention) that are stored in one or more storage elements (also referred to as computer usable medium). The storage element may be in the form of a database or a physical memory element present in the processing machine. The physical memory can be, for example but not limited to, an electronic, magnetic, optical, electromagnetic, infrared, or semiconductor system, apparatus, device, or propagation medium. More specific examples of the physical memory include, but not limited to, the following: a random access memory (RAM) a read-only memory (ROM), an erasable programmable read-only memory (EPROM or Flash memory), a Hard Disc Drive (HDD) and a compact disc read-only memory (CDROM).

The set of instructions may include various instructions that instruct the processing machine to perform the steps that constitute the method of overlap correction of 3D data in a PET system. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the invention has been described in terms of various specific embodiments, those skilled in the art will recognize that the invention can be practiced with modification within the spirit and scope of the claims.

What is claimed is:

1. A method for image overlap correction for a positron emission tomography system, said method comprising:
    acquiring emission projection data from a plurality of scan frames that extend across at least a portion of a length of an object being imaged wherein elements of the object lie between a region of overlap between two successive frames;
    iteratively reconstructing a 3D image volume from multi-frame emission projection data by updating a current estimate of 3D image volume using emission projection data from the plurality of frames simultaneously;
    outputting the reconstructed 3D image volume to at least one of a display and a computer-readable file;
    combining correction image data from the plurality of frames into a single correction image volume, wherein the correction image data is configured to correct an error in emission projection data; and
    updating the current estimate of the image volume by applying the correction from the correction image volume to form the subsequent image estimate.

2. A method in accordance with claim 1 further comprising:
    modeling the relative position of each image voxel with respect to each of the frame positions during forward projection of the entire image volume to generate multiple frames of estimated emission projection data;
    comparing the estimated multiple frame emission projection data with corresponding measured multiple frame emission projection data to generate multiple frames of correction projection data; and
    back-projecting the plurality of frames of correction projection data to generate the correction image data, wherein said combining the correction image data comprises combining the correction image data from the plurality of frames into the correction image volume accounting for regions of overlap.

3. A method in accordance with claim 1 wherein acquiring emission projection data from a plurality of scan frames comprises acquiring emission projection data from each of a $n^{th}$ frame that at least partially overlaps an n−1 frame of image data and an n+1 frame of image data.

4. A method in accordance with claim 1 wherein iteratively reconstructing a 3D image volume comprises updating image elements in the volume using the emission projection data from frames that include data for an associated element.

5. A method in accordance with claim 4 wherein updating image elements in the volume using the emission projection data from frames that include data for an associated element comprises updating elements in an overlap region using data from the frames that overlap.

6. A method in accordance with claim 1 further comprising modeling the relative position of each image voxel with respect to each of the frame positions including integrating along lines of the estimated image volume to transform the estimated image volume from an image representation to multiple frames of estimated emission projection data.

7. A method in accordance with claim 1 further comprising comparing the estimated multiple frame emission projection data with corresponding measured multiple frame emission projection data to generate multiple frames of correction projection data including determining the correction projection data, for all frames, as a ratio of the measured emission projection data and estimated emission projection data, for all frames.

8. A method in accordance with claim 1 further comprising comparing the estimated multiple frame emission projection data with corresponding measured multiple frame emission projection data to generate multiple frames of correction projection data including computing the correction projection data, for all frames, as the difference of the measured emission projection data and estimated emission projection data, for all frames.

9. A method in accordance with claim 1 wherein combining the correction image data from the plurality of frames into a single correction image volume accounting for regions of overlap comprises adding the image elements from the correction images from overlapped regions generated by the associated multiple frames.

10. A method in accordance with claim 1 wherein updating the current estimate of the image volume by applying the correction from the correction image volume to form the subsequent image estimate comprises computing the subsequent estimate of the image, for all frames, by scaling a ratio correction image, for all frames, and multiplying it with the current estimate of the image, for all frames.

11. A method in accordance with claim 1 wherein updating the current estimate of the image volume by applying the correction from the correction image volume to form the subsequent image estimate comprises computing the subsequent estimate of the image, for all frames, by scaling a difference correction image, for all frames, and adding it to the current estimate of the image, for all frames.

12. A method in accordance with claim 1 further comprising:
    modeling the relative position of each image voxel with respect to each of the frame positions during forward projection of the entire image volume to generate multiple frames of estimated emission projection data; and
    comparing the estimated multiple frame emission projection data with corresponding measured multiple frame emission projection data to generate multiple frames of correction projection data.

13. A method for image overlap correction of 3D images for a positron emission tomography system, said method comprising:
    receiving a plurality of frames of emission photon data from an object of interest;
    determining correction data corresponding to the emission data;

backprojecting at least a portion of the received emission data for each frame to generate a backprojected emission volume;

backprojecting at least a portion of the correction data corresponding to the received emission data to generate a backprojected correction volume;

determining a ratio of the backprojected emission volume to the backprojected correction volume for the plurality of frames using an iterative algorithm; and combining the ratio of the backprojected emission volume to the backprojected correction volume with a forward projection of a previous 3D image of the object of interest to estimate a current 3D image of the object of interest.

14. A positron emission tomography system comprising:
a positron emission tomography scanner; and
a controller for controlling the operation of the positron emission tomography scanner to combine overlapping portions of a plurality of frames of data, said controller comprising a memory, said controller configured to:
iteratively, for a plurality of 3D image planes;
forward project an estimate of a current image volume;
combine the forward projected estimate with a ratio of measured emission data and measured correction data to generate a ratio projection plane;
backproject the ratio projection plane to form a ratio image volume;
backproject the measured correction data to form a correction image volume; and
combine the ratio image and correction image from each frame to generate correction and ratio image volumes;
combine the ratio image volume with the correction image volume for the plurality of image frames to generate a subsequent estimate of the image volume.

15. A positron emission tomography system in accordance with claim 14 wherein said ratio projection plane comprises a plurality of 2D sinograms at different axial angles and displacements.

16. A positron emission tomography system in accordance with claim 15 wherein a number of iterations is selectable.

17. A positron emission tomography system in accordance with claim 15 wherein the measured emission data and measured correction data represent a subset of overlapped projection plane data from an emitting object of interest.

18. A positron emission tomography system in accordance with claim 14 wherein only one subset of overlapped projection plane data from a respective frame resides in the controller memory at a time.

19. A positron emission tomography system in accordance with claim 14 wherein said interaction comprises an Ordered Subsets Expectation Maximization (OSEM) algorithm.

20. A positron emission tomography system in accordance with claim 14 wherein said measured correction data comprises at least one of attenuation data, radiopharmaceutical decay data, and scattered photon data.

21. A positron emission tomography system in accordance with claim 14 wherein each said frame of said plurality of frames of data represents a different axial portion of the object of interest.

* * * * *